US010103902B1

(12) United States Patent
Sampath et al.

(10) Patent No.: US 10,103,902 B1
(45) Date of Patent: Oct. 16, 2018

(54) AUTO-DISCOVERY OF REPLICATION NODE AND REMOTE VTEPS IN VXLANS

(71) Applicant: Juniper Networks, Inc., Sunnyvale, CA (US)

(72) Inventors: Prabakaran Thirumali Sampath, San Jose, CA (US); SelvaKumar Sivaraj, Sunnyvale, CA (US); Ravi Shekhar, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 566 days.

(21) Appl. No.: 14/674,285

(22) Filed: Mar. 31, 2015

Related U.S. Application Data

(60) Provisional application No. 62/128,924, filed on Mar. 5, 2015.

(51) Int. Cl.
*H04L 12/28* (2006.01)
*H04L 12/46* (2006.01)
(Continued)

(52) U.S. Cl.
CPC ........ *H04L 12/467* (2013.01); *H04L 12/4675* (2013.01); *H04L 12/66* (2013.01);
(Continued)

(58) Field of Classification Search
CPC ... H04L 12/66; H04L 12/467; H04L 12/4675; H04L 45/26; H04L 45/74; H04L 49/25; H04L 65/1073
See application file for complete search history.

(56) References Cited

U.S. PATENT DOCUMENTS

2014/0208317 A1* 7/2014 Nakagawa .......... G06F 9/45533 718/1
2014/0337497 A1* 11/2014 Wanser ............... H04L 41/0866 709/223

(Continued)

OTHER PUBLICATIONS

Jain et al., "Generic Overlay OAM and Datapath Failure Detection," NVO3, Internet-Draft, draft-jain-nvo3-overlay-oam-01, The IETF Trust, Feb. 12, 2014, 44 pp.
(Continued)

*Primary Examiner* — Charles C Jiang
*Assistant Examiner* — Ryan Kavleski
(74) *Attorney, Agent, or Firm* — Shumaker & Sieffert, P.A.

(57) ABSTRACT

This disclosure describes techniques for utilizing VXLANs within a network, such as a data center, for transporting L2 customer communications. Moreover, the disclosure describes techniques for auto-discovering, for each VXLAN, a corresponding replication node for replicating and distributing unknown destination, broadcast, and multicast frames to VXLAN Tunnel Endpoints ("VTEPs") within the data center. Further, the techniques facilitate, by the replication node, discovery and auto-registration of the VTEPs for the respective customer network. As such, the techniques may facilitate configuration of VXLANs without necessarily relying on multicast protocols to provide such functionality. In this way, the techniques described herein may be used to supplement or even replace reliance on multicast protocols, such as the Protocol Independent Multicast (PIM) protocol, when configuring VXLANs within a network.

20 Claims, 16 Drawing Sheets

(51) Int. Cl.
*H04L 12/721* (2013.01)
*H04L 12/741* (2013.01)
*H04L 12/947* (2013.01)
*H04L 29/06* (2006.01)
*H04L 12/66* (2006.01)

(52) U.S. Cl.
CPC .............. *H04L 45/26* (2013.01); *H04L 45/74* (2013.01); *H04L 49/25* (2013.01); *H04L 65/1073* (2013.01)

(56) References Cited

U.S. PATENT DOCUMENTS

| | | | | |
|---|---|---|---|---|
| 2015/0010001 A1* | 1/2015 | Duda | ........................ | H04L 45/74 370/392 |
| 2015/0055651 A1* | 2/2015 | Shen | .................... | H04L 12/1854 370/390 |
| 2015/0172132 A1* | 6/2015 | Tessmer | .................... | H04L 45/16 370/390 |
| 2015/0200954 A1* | 7/2015 | Gourlay | .................... | H04L 49/70 726/4 |
| 2015/0280928 A1* | 10/2015 | Tessmer | .............. | H04L 12/4641 370/390 |
| 2015/0381484 A1* | 12/2015 | Hira | ........................ | H04L 45/64 370/390 |
| 2016/0149808 A1* | 5/2016 | Cai | .......................... | H04L 67/10 370/395.53 |
| 2017/0237650 A1* | 8/2017 | Beeram | ................... | H04L 45/16 370/390 |

OTHER PUBLICATIONS

"802.1AB-REV—Station and Media Access Control Connectivity Discovery," IEEE, Draft 6.0, Sep. 11, 2009, 4 pp.

Smit et al., "Intermediate System to Intermediate System (IS-IS) Extensions for Traffic Engineering (TE)," RFC 3784, Network Working Group, The Internet Society, Jun. 2004, 13 pp.

Berger et al., "The OSPF Opaque LSA Option," RFC 5250, Network Working Group, The IETF Trust, Jul. 2008, 17 pp.

Mahalingam et al., "Virtual eXtensible Local Area Network (VXLAN) : A Framework for Overlaying Virtualized Layer 2 Networks over Layer 3 Networks," RFC 7348, Independent Submission, The IETF Trust, Aug. 2014, 22 pp.

Singh et al., "VxLAN Router Alert Option," NVO3, Internet-Draft, draft-singh-nvo3-vxlan-router-alert-01, The IETF Trust, Mar. 3, 2014, 12 pp.

* cited by examiner

FIG. 9

| TLV TYPE | TLV LENGTH | OUI | VXLAN TYPE | VNI | REPLICATION NODE IP ADDRESS |
|---|---|---|---|---|---|
| 0 ... 7 | 8 ... 15 | 16 ... 39 | 40 ... 47 | 48 ... 71 | 72 ... 103 |

| TLV TYPE | TLV LENGTH | OUI | VXLAN TYPE | VNI ID START | VNI ID END | VNI BLOCK OFFSET | VNI BLOCK SIZE | VNI BASE | REPLICATION NODE IP ADDRESS |
|---|---|---|---|---|---|---|---|---|---|
| 0 ... 7 | 8 ... 15 | 16 ... 39 | 40 ... 47 | 48 ... 71 | 72 ... 95 | 96 ... 111 | 112 ... 127 | 128 ... 151 | 152 ... 183 |

240

| TYPE | LENGTH |
|------|--------|
| VALUE ||

FIG. 13A

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type = 1 (VXLAN RN is IPv4)   |            Length             |
+-+-+-+-+-+-+-+-+-+-+-+-+-+-+-+-+-+-+-+-+-+-+-+-+-+-+-+-+-+-+-+-+
|           VXLAN VNI           |           RESERVED            |
+-+-+-+-+-+-+-+-+-+-+-+-+-+-+-+-+-+-+-+-+-+-+-+-+-+-+-+-+-+-+-+-+
|                  IPv4 Replication Node Address                |
+-+-+-+-+-+-+-+-+-+-+-+-+-+-+-+-+-+-+-+-+-+-+-+-+-+-+-+-+-+-+-+-+

TLV if Replication node is IPv4
```

FIG. 13B

```
 0                   1                   2                   3
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
| Type = 2 (VXLAN RN is IPv6)   |            Length             |
+-+-+-+-+-+-+-+-+-+-+-+-+-+-+-+-+-+-+-+-+-+-+-+-+-+-+-+-+-+-+-+-+
|           VXLAN VNI           |           RESERVED            |
+-+-+-+-+-+-+-+-+-+-+-+-+-+-+-+-+-+-+-+-+-+-+-+-+-+-+-+-+-+-+-+-+
|                                                               |
|                  IPv6 Replication Node Address                |
|                                                               |
+-+-+-+-+-+-+-+-+-+-+-+-+-+-+-+-+-+-+-+-+-+-+-+-+-+-+-+-+-+-+-+-+

TLV if Replication node is IPv6
```

FIG. 13C

TLV if VTEP is IPv4

TLV if VTEP is IPv6

AUTO-DISCOVERY OF REPLICATION NODE AND REMOTE VTEPS IN VXLANS

This application claims the benefit of U.S. Provisional Application 62/128,924, filed Mar. 5, 2015, the entire contents of which are incorporated herein by reference.

TECHNICAL FIELD

The invention relates to computer networks and, more particularly, to data centers that provide virtual networks.

BACKGROUND

In a typical cloud-based data center, a large collection of interconnected servers provides computing and/or storage capacity for execution of various applications. For example, a data center may comprise a facility that hosts applications and services for subscribers, i.e., customers of a data center. The data center may, for example, host all of the infrastructure equipment, such as networking and storage systems, redundant power supplies, and environmental controls. In most data centers, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Moreover, customer equipment within each data center may be virtually isolated onto a respective Virtual Extensible LAN (VXLAN). That is, the routing and switching devices of a data center provide an underlay network that transports layer two (L2) communications for customer networks through a respective VXLAN overlay network for each customer. That is, VXLAN overlay networks are designated for each customer network and operated over the existing LAN infrastructure of the data center.

In VXLAN-based networks, multicast technologies are used for carrying unknown destination, broadcast, and multicast frames. As such, use of VXLANs tends to rely on other multicast protocols executing within the data center, such as the Protocol Independent Multicast (PIM) protocol, for establishing tunnels for communicating customer data traffic through the data center.

SUMMARY

This disclosure describes techniques for utilizing VXLANs within a network, such as a data center, for transporting L2 customer communications. Moreover, the disclosure describes techniques for auto-discovering, for each VXLAN, a corresponding replication node for replicating and distributing unknown destination, broadcast, and multicast frames to VXLAN Tunnel Endpoints ("VTEPs") within the data center. Further, the techniques facilitate, by the replication node, discovery and auto-registration of the VTEPs for the respective customer network. As such, the techniques may facilitate configuration of VXLANs without necessarily relying on multicast protocols to provide such functionality. In this way, the techniques described herein may be used to supplement or even replace reliance on multicast protocols, such as the Protocol Independent Multicast (PIM) protocol, when configuring VXLANs within a network.

In one example a method comprises sending, by a router that includes a replication node for broadcast, unidentified unicast and multicast (BUM) traffic in a virtual extensible local area network (VXLAN) toward one or more VXLAN tunnel endpoints (VTEPs), an advertisement including an address of the replication node and at least one virtual network identifier (VNI) range associated with the replication node. The method includes, in response to the advertisement, receiving, by the router, at least one registration message including VNI ranges in which the VTEPs are interested. The method further includes, upon receiving the at least one registration message, constructing, by the router, a distribution tree in the VXLAN and replicating, by the replication node of the router, BUM traffic toward the VTEPs via the distribution tree.

In another example, a router in a virtual extensible local area network (VXLAN) comprises a forwarding engine having a replication node configured to replicate broadcast, unidentified unicast and multicast (BUM) traffic, and a routing engine configured to send toward one or more VXLAN tunnel endpoints (VTEPs) an advertisement including an address of the replication node and at least one virtual network identifier (VNI) range associated with the replication node. The routing engine is further configured to, in response to the advertisement, receive at least one registration message including VNI ranges in which the VTEPs are interested, and, upon receiving the at least one registration message, construct a distribution tree in the VXLAN by which the replication node replicates BUM traffic toward the VTEPs.

In another example, a method comprises receiving, by a network switch in a virtual extensible local area network (VXLAN) from a router that includes a replication node for broadcast, unidentified unicast and multicast (BUM) traffic, a first advertisement including an address of the replication node and at least one virtual network identifier (VNI) range associated with the replication node. The method further comprises, upon receiving the first advertisement, sending, by the network switch to one or more VXLAN tunnel endpoints (VTEPs) connected to the network switch in the VXLAN, a second advertisement including the address of the replication node and the at least one VNI range associated with the replication node. The method further comprises, upon registration of at least one of the VTEPs with the router and construction of a distribution tree in the VXLAN, forwarding, by the network switch, BUM traffic received from the replication node of the router toward the VTEPs.

In another example, a network switch in a virtual extensible local area network (VXLAN) comprises a routing engine configured to receive, from a router that includes a replication node for broadcast, unidentified unicast and multicast (BUM) traffic, a first advertisement including an address of the replication node and at least one virtual network identifier (VNI) range associated with the replication node and, upon receiving the first advertisement, send a second advertisement including the address of the replication node and the at least one VNI range associated with the replication node to one or more VXLAN tunnel endpoints (VTEPs) connected to the network switch in the VXLAN. The network switch includes a forwarding engine configured to, upon registration of at least one of the VTEPs with the router and construction of a distribution tree in the VXLAN, forward BUM traffic received from the replication node of the router toward the VTEPs.

In another example, a system comprises a router that includes a replication node for broadcast, unidentified unicast and multicast (BUM) traffic in a virtual extensible local area network (VXLAN). The router is configured to send a first advertisement including an address of the replication node and at least one virtual network identifier (VNI) range associated with the replication node using an Internal Gateway Protocol (IGP). The system further includes one or more network switches connected to the router included in the VXLAN, each of the network switches is configured to receive the first advertisement and send a second advertisement including the address of the replication node and the at least one VNI range associated with the replication node using a link layer discovery protocol (LLDP). In addition, the system includes one or more VXLAN tunnel endpoints (VTEPs) connected to the one or more network switches in the VXLAN, each of the VTEPs is configured to indicate VNI ranges in which the respective one of the VTEPs is interested. In response to the first advertisement, the router receives at least one registration message including the VNI ranges in which the one or more VTEPs are interested, constructs a distribution tree in the VXLAN, and replicates BUM traffic toward the VTEPs via the distribution tree. The one or more network switches forward the BUM traffic received from the router toward the VTEPs.

The details of one or more embodiments are set forth in the accompanying drawings and the description below. Other features, objects, and advantages will be apparent from the description and drawings, and from the claims.

BRIEF DESCRIPTION OF DRAWINGS

FIG. 9 is a block diagram illustrating a VNI Replication ID TLV.

FIG. 10 is a block diagram illustrating a VNI Replication ID Range TLV.

FIGS. 13A-13E are block diagrams illustrating a TLV structures for advertising VNI to replication node binding data and VNI to VTEP binding data using an interior gateway protocol, such as OSPF.

DETAILED DESCRIPTION

Figure 1:
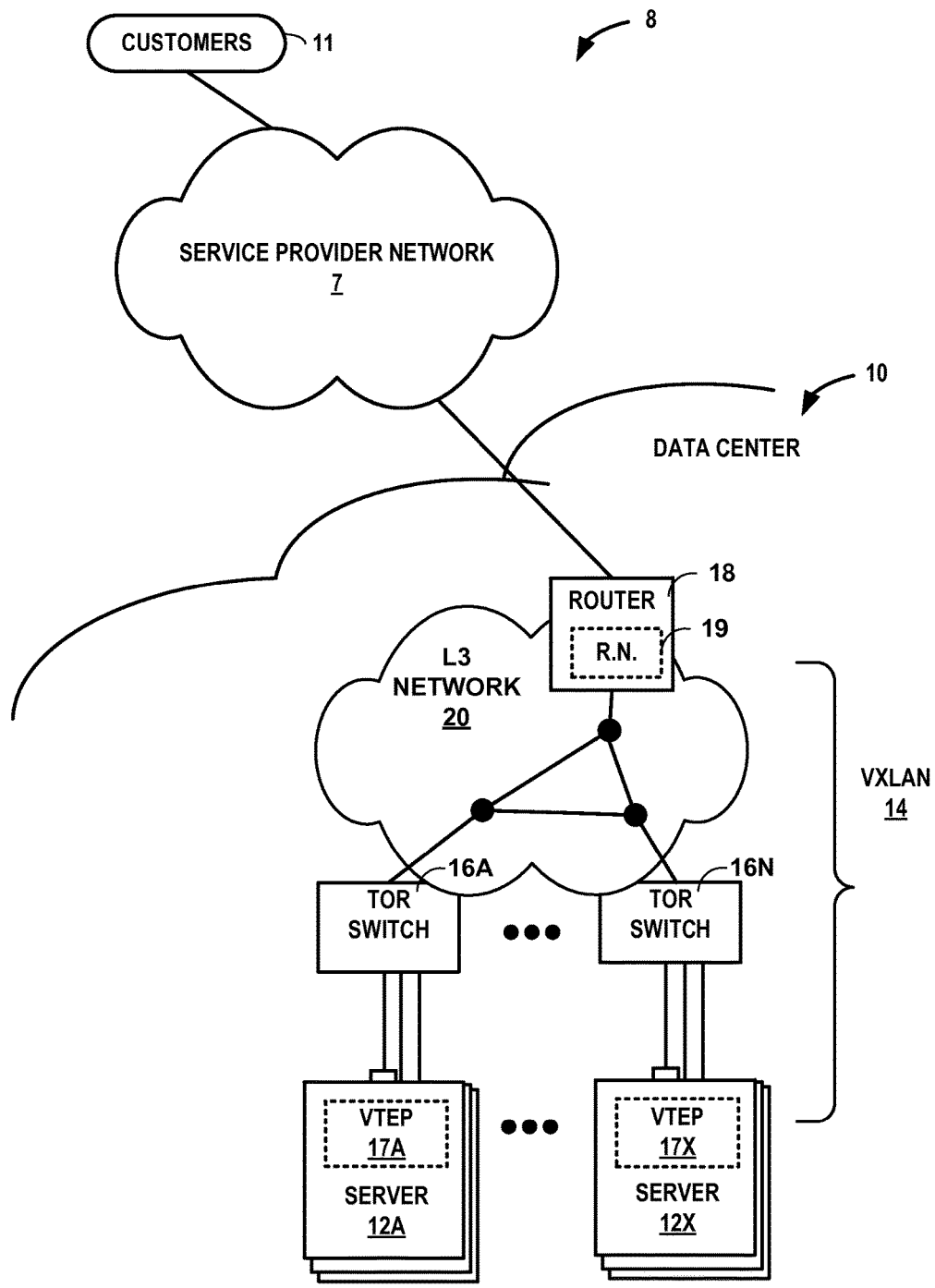
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric provided by one or more tiers of physical network switches and routers. Servers 12 provide execution and storage environments for applications and data associated with customers 11 and may be physical servers, virtual machines or combinations thereof.

That is, servers 12 of data center 10 provide execution environments for physical or virtual machines (VMs) and other customer equipment 4 that provide computing environments for customers 11.

Switch fabric interconnecting servers 12 represents layer two (L2) and layer three (L3) switching and routing components that provide point-to-point connectivity between servers 12. In the example of FIG. 1, the switch fabric is provided by a set of interconnected top-of-rack (TOR) switches 16A-16BN (collectively, "TOR switches 16") coupled to L3 network 20 having one or more routers 18. Although referred to as switches 16, in addition to providing L2 switching operations, each of the switches may provide L3 routing operations or other functions. For example, switches 16 may execute routing protocols, such as interior gateway routing protocols (IGPs), so as to participate in or otherwise receive routing protocol messages associated with the routing domain of L3 network 20. In other words, TOR switches 16 may be network devices that provide layer 2 (e.g, MAC) and/or layer 3 (e.g., IP) routing and/or switching functionality. TOR switches 16 and router 18 each may include one or more processors and a memory, and that are capable of executing one or more software processes Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

L2 communications, such as Ethernet packets or "frames," associated with customer-specific virtual machines executing on servers 12 within data center 10 are virtually isolated onto different Virtual Extensible LANs (VXLANs) 14. That is, switches 16 and other components of L3 network 20 operate as an underlay network of transport routers that transport L2 communications for customer networks through the respective VXLANs 14 as an overlay network for each customer.

Techniques are described herein for auto-discovering, for each VXLAN 14, a corresponding replication node ("R.N.") 19 for replicating and distributing unknown destination, broadcast, and multicast frames to VXLAN Tunnel Endpoints ("VTEPs") 17A-17X within data center 10. Further, techniques are described that facilitate discovery and auto-registration, by replication node 19, of VTEPs 17 for the each respective customer VXLAN. As such, the techniques may facilitate configuration of VXLANs 14 within data center 10 without necessarily relying on multicast protocols to provide such functionality. In this way, the techniques described herein may be used to supplement or even replace reliance on multicast protocols, such as Protocol Independent Multicast (PIM) protocol, when configuring VXLANs within a network.

Figure 2:
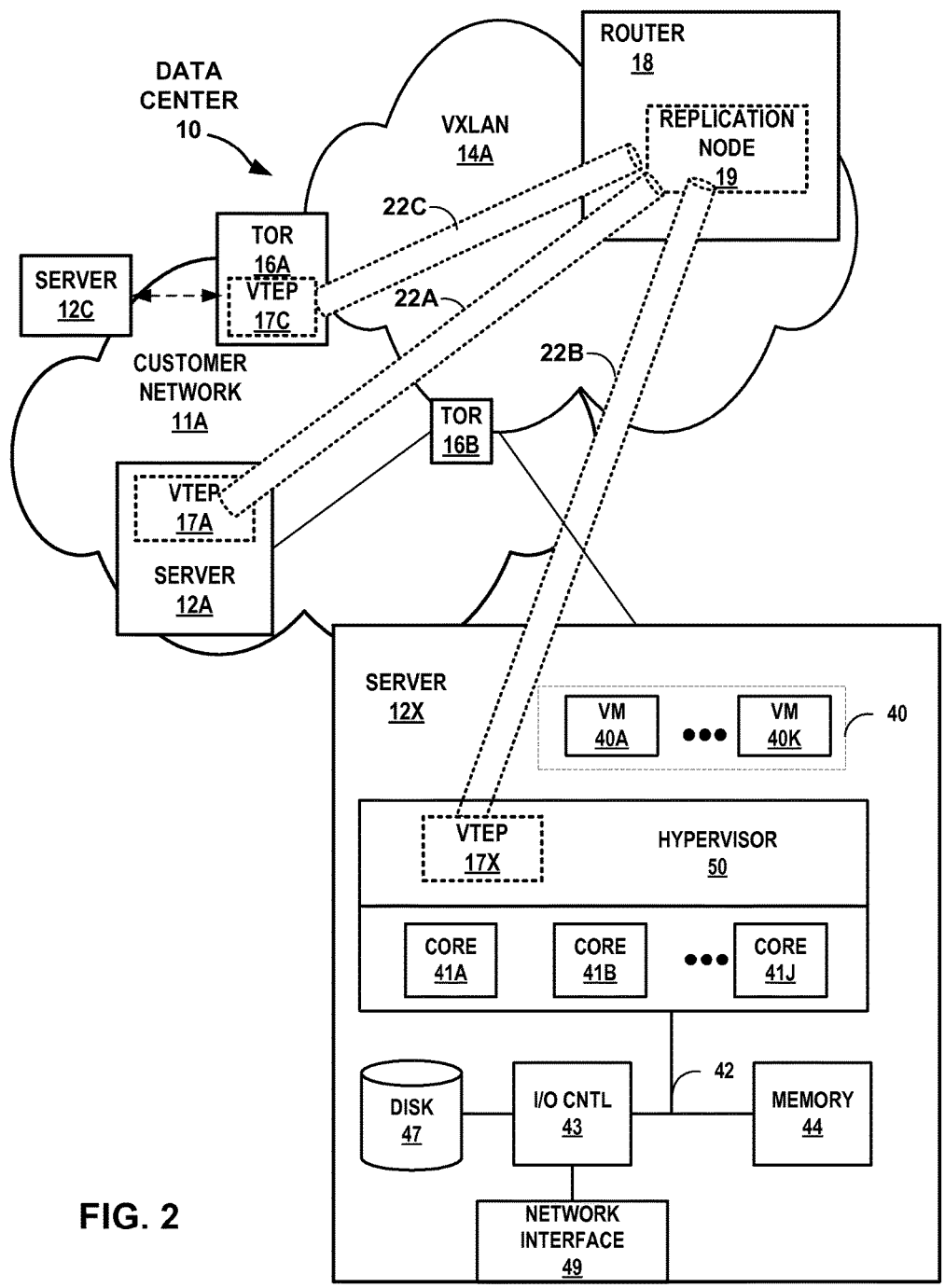
FIG. 2 is a block diagram illustrating in further detail portions of the example network system of FIG. 1.

FIG. 2 is a block diagram illustrating in further detail portions of the example network system of FIG. 1 in accordance with the techniques described herein. In the example of FIG. 2, VXLAN tunnels 22A, 22B and 22C are shown between VTEPs 17A, 17X, 17C and replication node 19, respective, for transporting customer traffic. In this way, router 18 operates as a VXLAN replication node for a given customer network 11A and provides a hub for communicating unknown destination, broadcast, and multicast frames between the customer equipment, e.g., virtual machines, of the customer. As shown, VTEPs may be constructed within servers or TORs and may operate according to the techniques described herein.

Moreover, FIG. 2 illustrates an example server 12X in further detail. As shown in FIG. 2, server 12X provides an operating environment for a plurality of customer virtual machines (VMs) 40A-40K. For example, server 12X includes a multi-core computing environment having a plurality of processing cores 41A-41J (collectively, "processing cores 41") that are coupled by system bus 42 to memory 44 and input/output (I/O) controller 43. I/O controller 43 provides access to storage disk 47 and network interface 49 for physical connectivity to the underlying network.

The multi-core computing environment of server 12X may include any number of processors and any number of hardware cores from, for example, four to thousands. Each of processing cores 41 includes an independent execution unit to perform instructions that conform to an instruction set architecture for the core. Processing cores 41 may each be implemented as separate integrated circuits (ICs) or may be combined within one or more multi-core processors (or "many-core" processors) that are each implemented using a single IC (i.e., a chip multiprocessor).

Disk 47 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 41.

Main memory 44 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 44 provides a physical address space composed of addressable memory locations.

Memory 44 may in some examples present a non-uniform memory access (NUMA) architecture to the multi-core computing environment. That is, cores 41 may not have equal memory access time to the various storage media that constitute memory 44. Cores 41 may be configured in some instances to use the portions of memory 44 that offer the lowest memory latency for the cores to reduce overall memory latency.

In some instances, a physical address space for a computer-readable storage medium may be shared among one or more cores 41 (i.e., a shared memory). For example, cores 41A, 41B may be connected via a memory bus (not shown) to one or more DRAM packages, modules, and/or chips (also not shown) that present a physical address space accessible by cores 41A, 41B. While this physical address space may offer the lowest memory access time to cores 41A, 41B of any of portions of memory 44, at least some of the remaining portions of memory 44 may be directly accessible to cores 41A, 41B. One or more of cores 41 may also include an L1/L2/L3 cache or a combination thereof. The respective caches for cores 41 offer the lowest-latency memory access of any of storage media for the cores 41.

In this way, server 12X provides an operating environment for one or more virtual machines 40A-40K (collectively, "virtual machines 40"). Server 12X may partition the virtual and/or physical address space provided by main memory 44 and, in the case of virtual memory, by disk 47 into user space, allocated for running user processes, and kernel space, which is protected and generally inaccessible by user processes. An operating system kernel (not shown in FIG. 2) may execute in kernel space and may include, for example, a Linux, Berkeley Software Distribution (BSD), another Unix-variant kernel, or a Windows server operating system kernel, available from Microsoft Corp.

In the example of FIG. 2, server 12X executes a hypervisor 50 to manage virtual machines 40. Example hypervisors include Kernel-based Virtual Machine (KVM) for the Linux kernel, Xen, ESXi available from VMware, Windows Hyper-V available from Microsoft, and other open-source and proprietary hypervisors. In this example, hypervisor 50 includes instruction to operate VTEP 17X so as to provide a termination point for VXLAN tunnel 22B for communicating L2 communications with replication node 19. That is, hypervisor 50 executes VTEP 17X to process outbound L2 communications (e.g., unknown destination, broadcast, and multicast frames) from VMs 40 so as to encapsulate the L2 communications within VXLAN tunnel 22B for communication to replication node 19. Similarly, hypervisor 50 executes VTEP 50 to de-encapsulate L2 communications received from VXLAN tunnel 22B and provides the L2 communications to VMs 40.

Figure 3:
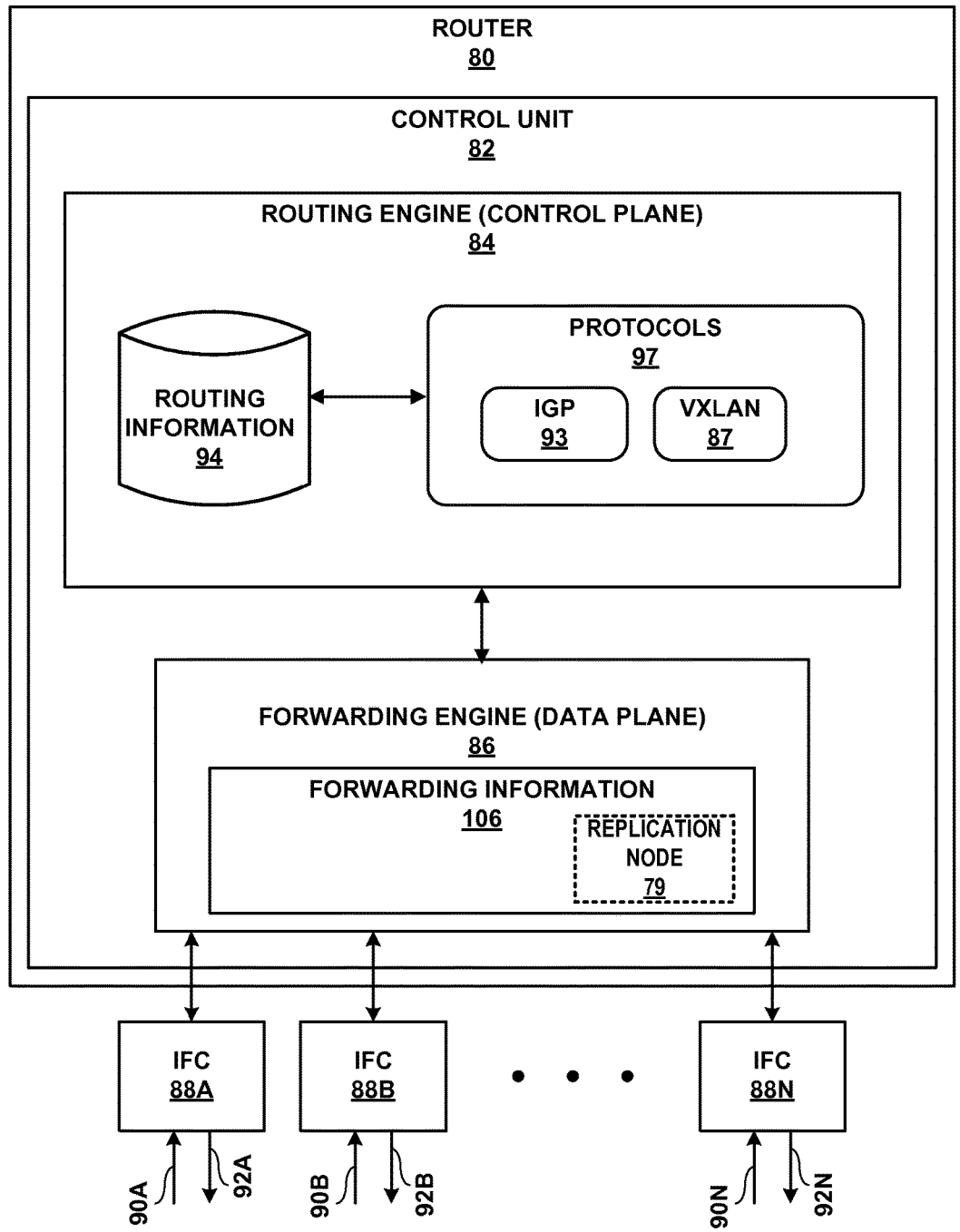
FIG. 3 is a block diagram illustrating an exemplary router capable of performing the disclosed techniques.

FIG. 3 is a block diagram illustrating an exemplary router 80 capable of performing the disclosed techniques. In general, router 80 may operate substantially similar to router 18 of FIGS. 1-2.

In this example, router 80 includes interface cards 88A-88N ("IFCs 88") that receive multicast packets via incoming links 90A-90N ("incoming links 90") and send multicast packets via outbound links 92A-92N ("outbound links 92").

IFCs 88 are typically coupled to links 90, 92 via a number of interface ports. Router 80 also includes a control unit 82 that determines routes of received packets and forwards the packets accordingly via IFCs 88.

Control unit 82 may comprise a routing engine 84 and a packet forwarding engine 86. Routing engine 84 operates as the control plane for router 80 and includes an operating system that provides a multi-tasking operating environment for execution of a number of concurrent processes. Routing engine 84 may, for example, execute software instructions to implement one or more control plane networking protocols 97. For example, protocols 97 may include one or more routing protocols, such as an interior gateway protocol (IGP) 93, for exchanging routing information with other routing devices and for updating routing information 94. Example IGP routing protocol include Open Shortest Path First (OSPF) and Intermediate system to intermediate system (IS-IS) routing protocols, which are link state protocols that use link state messages to ensure their routing topology is synchronized with respect to available interfaces, metrics and other variables associated with network links.

Routing information 94 may describe a topology of the computer network in which router 80 resides. For example, routing information 94 may take the form of a link state database storing link state advertisements (LSAs) that reflect the current link state data of layer three (L3) routing domain. For example, routing engine 84 provides an operating environment for execution of IGP 93 that communicates with peer routers and periodically updates the link state database to accurately reflect the link state of the routing domain within which router 80 operates.

Routing engine 84 analyzes stored routing information 94 and generates forwarding information 106 for forwarding engine 86. Forwarding information 106 may associate, for example, network destinations for certain multicast groups with specific next hops and corresponding IFCs 88 and physical output ports for output links 92. Forwarding information 106 may be a radix tree programmed into dedicated forwarding chips, a series of tables, a complex database, a link list, a radix tree, a database, a flat file, or various other data structures.

In addition, routing engine 84 executes VXLAN protocol 87, which operates to configure and support VXLANs within the network in which router 80 resides. Routing engine 84 operates to configure forwarding engine 86 to operate as a replication node for one or more VXLANs. Moreover, IGP 93 and VXLAN 87 implement the techniques described herein to facilitate auto-discovery of VXLAN replication nodes and VTEPs.

The architecture of router 80 illustrated in FIG. 3 is shown for exemplary purposes only. The invention is not limited to this architecture. In other examples, router 80 may be configured in a variety of ways. In one example, some of the functionally of control unit 82 may be distributed within IFCs 88. In another example, control unit 82 may comprise a plurality of packet forwarding engines operated as slave routers.

Control unit 82 may be implemented solely in software, or hardware, or may be implemented as a combination of software, hardware, or firmware. For example, control unit 82 may include one or more processors which execute software instructions. In that case, the various software modules of control unit 82 may comprise executable instructions stored on a computer-readable medium, such as computer memory or hard disk.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer-readable data storage medium comprising instructions that, when executed, cause a processor to perform one or more of the methods described above. For example, the computer-readable data storage medium may store such instructions for execution by a processor.

A computer-readable medium may form part of a computer program product, which may include packaging materials. A computer-readable medium may comprise a computer data storage medium such as random access memory (RAM), read-only memory (ROM), non-volatile random access memory (NVRAM), electrically erasable programmable read-only memory (EEPROM), Flash memory, magnetic or optical data storage media, and the like. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, functionality described in this disclosure may be provided within software modules or hardware modules.

Figure 4:
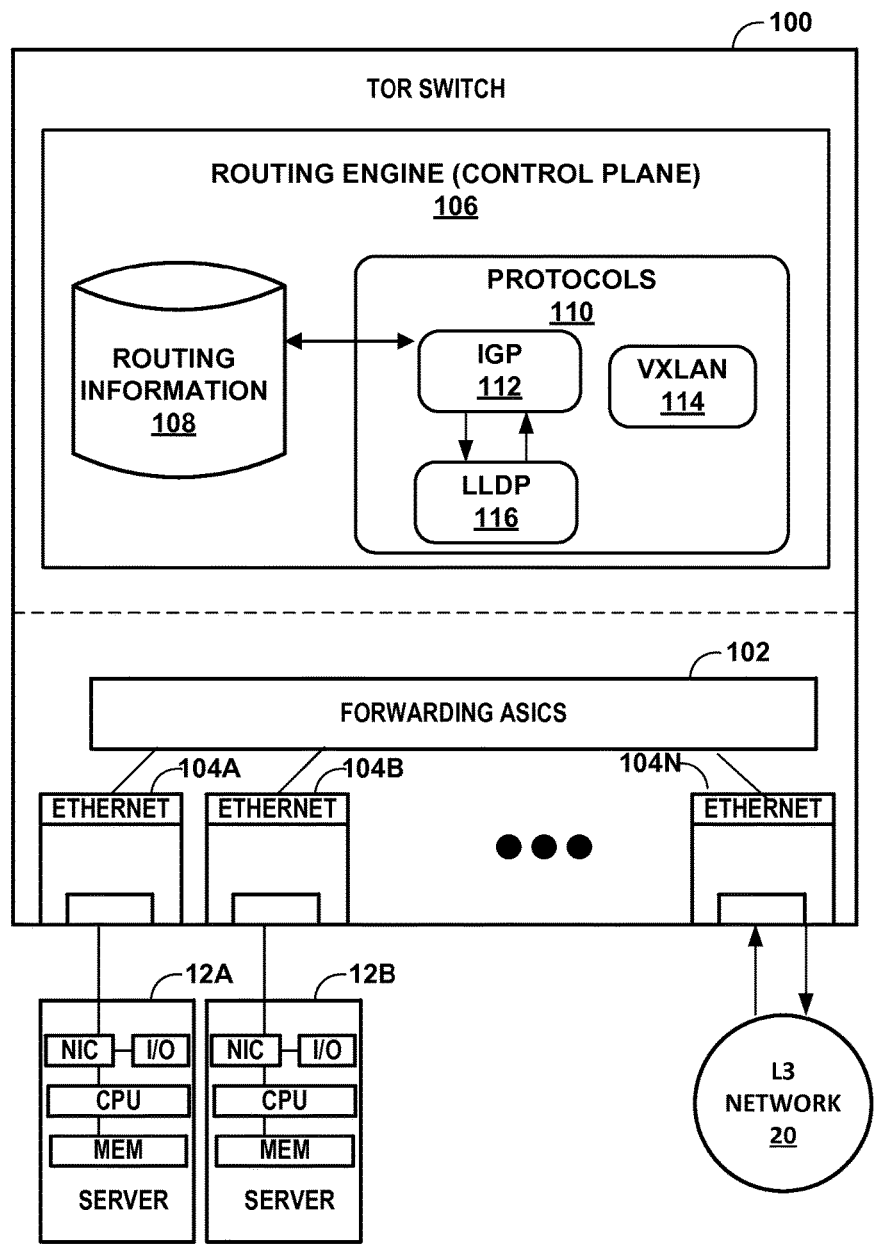
FIG. 4 is a block diagram illustrating an example implementation in which host network accelerators are deployed within top-of-rack switches (TORs) of the data center.

FIG. 4 is a block diagram illustrating an example implementation of top-of-rack switches (TORs) of data center 10. TOR switch may, for example, represent an example implementation of TOR switches 8 of FIGS. 1-2.

In this example, TOR switch 100 includes high-speed switching ASICs 102 for forwarding packets between Ethernet interfaces 104A-104N, which in turn are connected to servers 12 or L3 network 20.

In addition, TOR switch 100 incorporates a routing engine 106 to support L3 routing functions. Routing engine 106 operates as the control plane for TOR switch 100 and implements one or more control plane networking protocols 110. For example, protocols 110 may include one or more routing protocols, such as an interior gateway protocol (IGP) 112, for exchanging routing information with other routing devices and for updating routing information 108, which may take the form of a link state database storing LSAs that reflect the current link state data of L3 routing domain.

In addition, TOR switch 100 executes a layer two (L2) link-layer protocol, such as the Link Layer Data Protocol (LLDP), to output LLDP Data Units (LLDPDU) on each interface to advertise its capabilities to neighboring devices and monitor link status. As described herein, LLDP protocol 116 operates utilizing enhanced LLDP data messages as described herein to facilitate auto-discovery of VXLAN replication nodes and VTEPs.

Figure 5A:
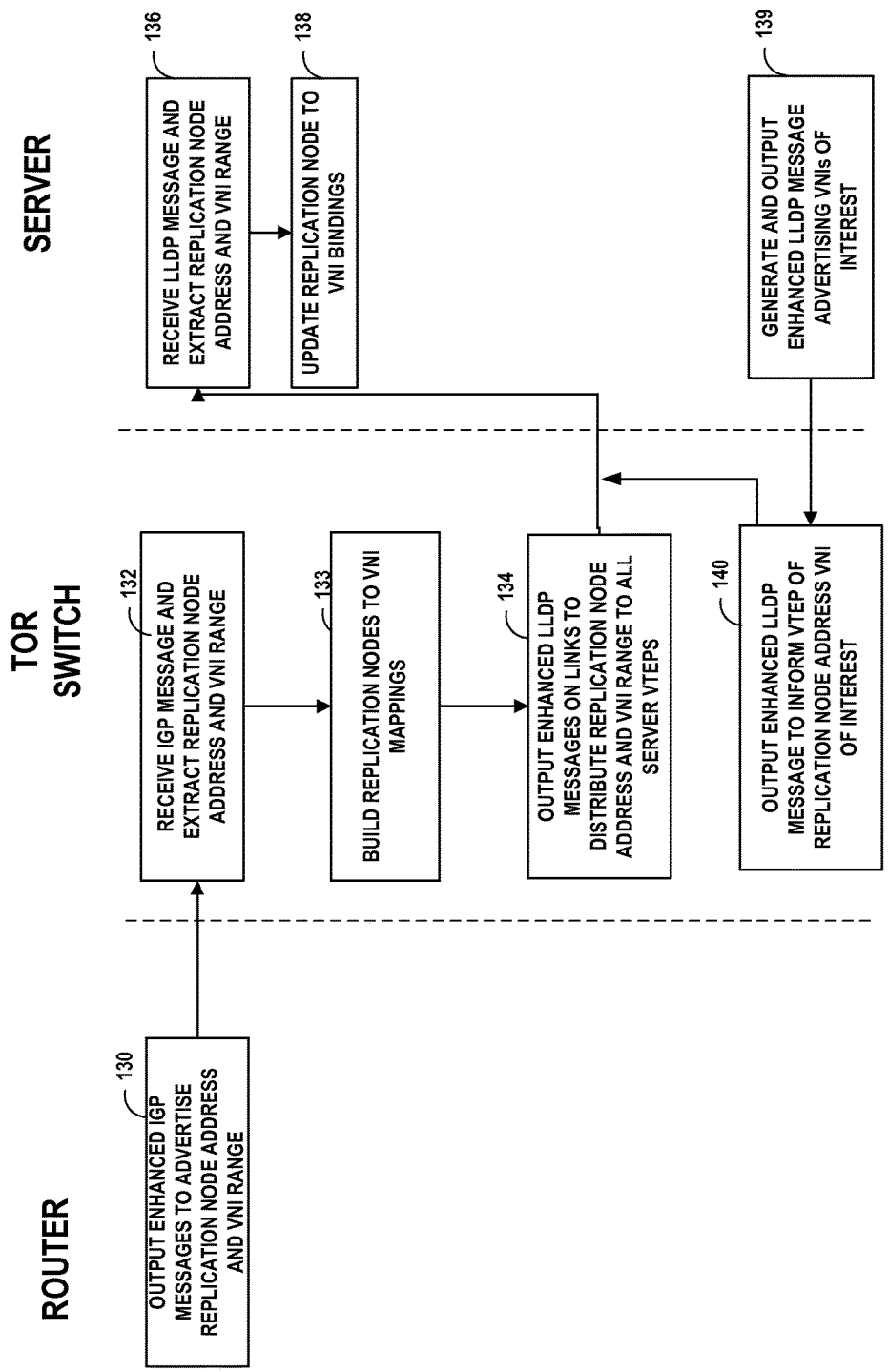
FIG. 5A is a flow diagram illustrating example operation for automatically communicating and distributing identification information, e.g., address, of the replication node to each VTEP for a given VXLAN.

FIG. 5A is a flow diagram illustrating example operation for automatically communicating and distributing identification information, e.g., address, of the replication node to each VTEP for a given VXLAN.

Figure 14:
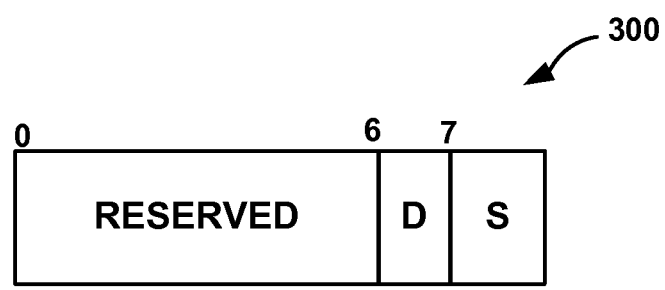
FIG. 14 is a block diagram illustrating an IS-IS Router Capability TLV.

Initially, router 18 advertises the address and VNI range of replication node 19 using IGP (130). In other words, router 18 outputs messages to advertise the replication node 19 to VNI bindings using the IGP protocol. For example, the address and VNI range of replication node 19 is advertised using as opaque LSAs in OSPF, as shown in FIG. 12 and discussed below. As another example, the address and VNI range may be advertised as a router capability in IS-IS, as shown in FIG. 14.

IGP protocols within each of TOR switch 8 receives the advertised address and VNI range of replication node 19 (132) and internally builds replication nodes to VNI bindings (133). Next, TOR switch 8 propagates the replication node to VNI bindings by constructing and outputting enhanced LLDP messages to inform the VTEPs 17 within servers 12 of the replication node to VNI binding announced by the router (134). That is, each TOR switch 8 advertises to each VTEP 17 the replication node 19 address and the VNI range for which the replication node is servicing by outputting LLDP messages on all directly-connected physical ports. See, for example, FIGS. 9-10 discussed below. Each VTEP connected to the TOR switch receives an enhanced LLDP message from the TOR switch and updates its internal replication node to VNI bindings (136).

Separately, each VTEPs executing within the hypervisors of servers 12 may advertise a list of VNIs for which that VTEP is interested using LLDP messages (139). As one example, VTEPs within the hypervisors generate enhanced LLDP messages using the VNI TLV structure shown in FIGS. 7-8 to advertise the VNI ID details using LLDP OUI TLVs. Upon receiving the LLDP messages from the VTEPs, each TOR switch 8 builds VTEP server bindings that map the server VTEPs to VNIs of interest (133). If replication nodes to VNI bindings have already been received for the identified VNIs of interest, TOR switch 8 responds by constructing and sending an enhanced LLDP message to inform the server VTEP of the replication node to VNI binding for the VNIs of interest (140). In this way, the VTEPs executing within the hypervisors of servers 12 receive enhanced LLDP messages and so as to learn the replication node address and VNI range that is serviced by replication node 19. IPG and LLDP refresh mechanisms are used to handle replication node failures or configuration changes in the network. One advantage of using the LSAs and LLDP for distributing the information in this way may be increased ability to handle failures of replication nodes and increased redundancy within the network.

Figure 5B:
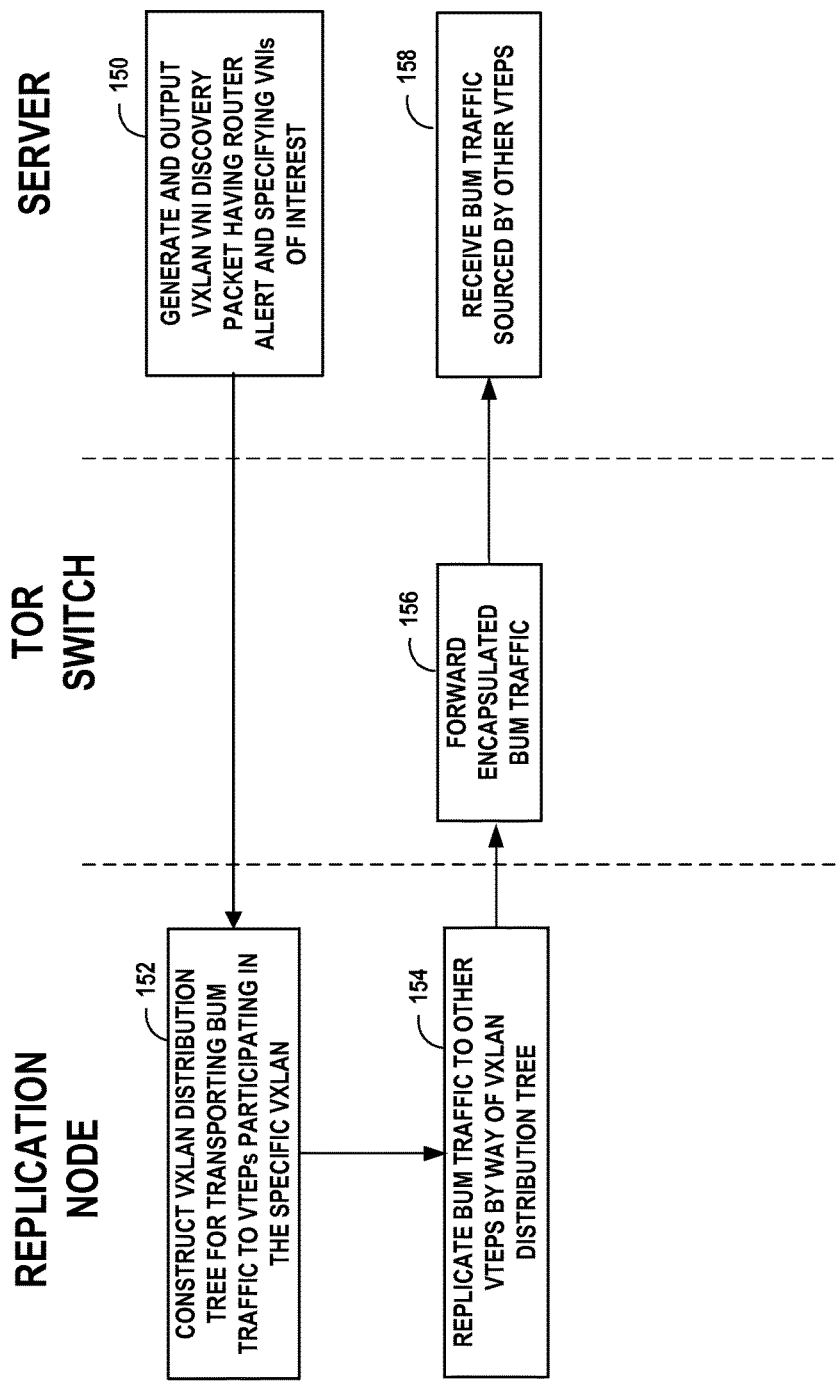
FIGS. 5B-5D are flow diagrams illustrating three example methods for discovering VXLAN replication nodes in accordance with the techniques described herein.
Figure 5C:
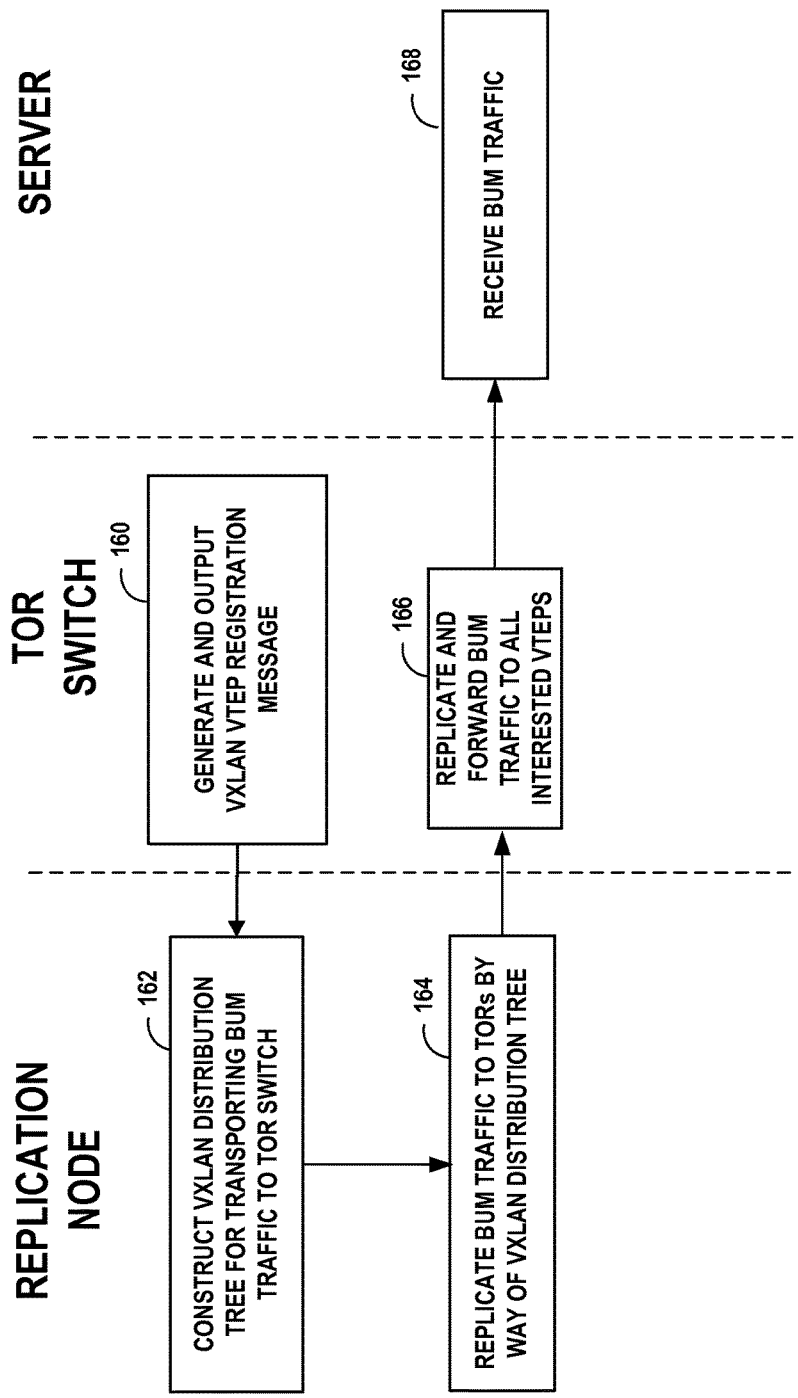
Figure 5D:
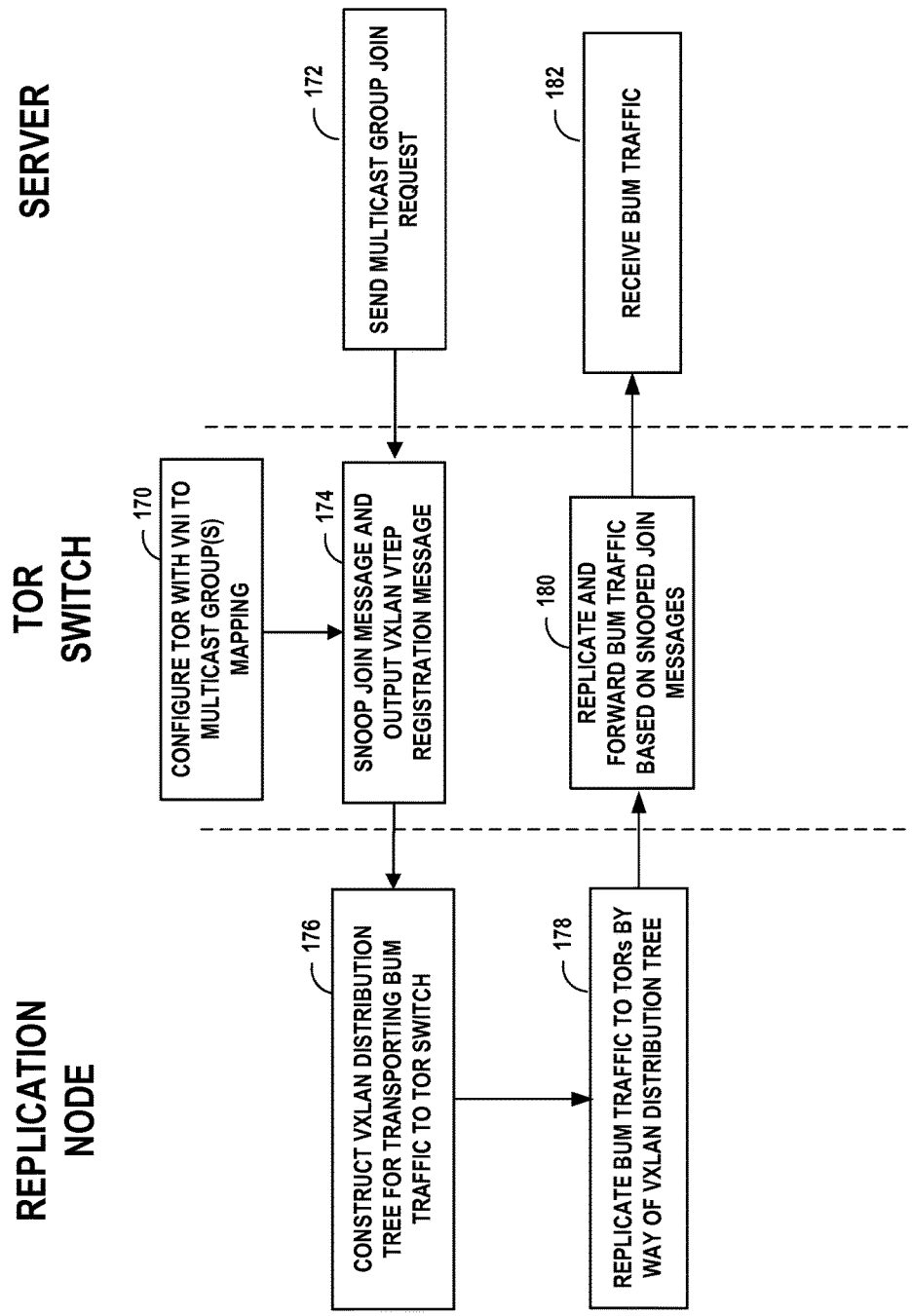

FIGS. 5B-5D are flow diagrams illustrating three example methods for discovering VXLAN replication nodes in accordance with the techniques described herein. FIG. 5B, for example, is a flowchart illustrating a first example technique by which the replication node discovers VTEPs 17 using a VXLAN router alert. Upon discovering replication node 19 for a specific VNI of interest, each VTEP 17 outputs a VNI discovery packet to replication node 19 with the router alert bit set (150). This informs router 19 that this packet is to be handled by the control plane, causing the packet to be delivered to the VXLAN protocol executing on the router. In the VNI packet, the VTEP 17 specifies the particular VNI(s) that the VTEP is interested in. VTEPs 17 may output the VNI discovery packets periodically so as to update replication node 19. Further example details are discussed below with respect to FIG. 6 below.

Upon receiving one or more VNI discovery packet from VTEPs 17, the VXLAN protocol of the replication node 19 processes the VNI discovery packets and constructs a replication tree of VXLAN tunnels 22 for the VNI (152). As such, replication node is now able to replicate BUM traffic and distributes the BUM traffic by VXLAN tunnels 22 to all other VTEPs participating in the VXLAN (154, 156, 158).

FIG. 5C is a flowchart illustrating second example in which the replication node discovers VTEPs 17 using an intermediate TOR switch 8 as proxy for replicating BUM traffic. Upon TOR switch learning replication node to VNI bindings and also learning VNI to server VTEP bindings, as described above with respect to FIG. 5A, the TOR switch registers itself with the replication node using enhanced IGP messages as VTEP endpoint registration messages (160). The TORs switches may, for example, advertise the VTEP endpoints to the replication node and register on their behalf using OSPF Opaque LSAs, which are described in more detail with reference to FIG. 12, or using IS-IS router capability TLVs, which are described in more detail with reference to FIG. 14.

Upon receiving the VTEP endpoint registration message from the TOR switches, replication node 19 constructs a replication tree of VXLAN tunnels for the VNI so as to terminate at the TOR switches (162). As such, BUM traffic distributed by the replication node arrives at the TOR switches instead of the servers (164). The TOR switch, in turn, sends the BUM traffic directly to all interested VTEPs that have issued enhanced LLDP messages (see 139 of FIG. 5A) (166).

As such, in accordance with the example of FIG. 5C, VTEP endpoints may be discovered using a proxy mode. As described, a TOR switch receives LLDP messages from directly connected servers, and then "proxies" on behalf of all servers toward the replication node using IGP. In some examples, the replication node makes a single copy to the TOR switch, and then the TOR switch in turn will make relevant copies to the attached servers. This is a very scalable and easily deployable way of doing replication while designing a pod. For example, multiple L3 routers may be divided across VNI ranges and provide replication nodes for the different ranges. TOR switches may attach themselves to different L3 routers, and servers may receive replicated BUM traffic from the attached TOR. As racks are added, the replication capability increases with TORs.

FIG. 5D is a flowchart illustrating third example in which the replication node discovers VTEPs 17 by way of multicast join snooping applied by an intermediate TOR switch 8. In this example, a TOR switch is configured with a VNI to multicast group mapping or the TOR switch discovers the mapping by snooping multicast data packets distributed by a replication node (170).

Next, the TOR switch receives an IGMP message join for a multicast group output by a directly-connected VTEP server for a particular multicast group (172). The TOR switch snoops the message, i.e., detects the IGMP join and directs the IGMP join to its control plane for processing, and learns that the VTEP server is interested in this specific multicast group (174). As such, the TOR switch builds a list of VTEPs that are interested in this multicast group. Moreover, since the TOR switch is preconfigured with a VNID to multicast group mapping, responsive to snooped IGMP message sourced by the VTEP servers, the TOR switch discovers which VTEP servers are interested in which VNIs.

In response to snoop an IGMP join, the TOR switch registers itself with the replication node using enhanced IGP messages as VTEP endpoint registration messages (174). In turn, replication node 19 constructs a replication tree of VXLAN tunnels for the VNI so as to terminate at the TOR switches (176). As such, BUM traffic distributed by the replication node arrives at the TOR switches instead of the servers (178,180). The TOR switch, in turn, sends the BUM traffic directly to the VTEPs for which IGMP join messages were snooped (180). As such, when a packet is received from the ingress replication node, the TOR switch uses multicast tree information to send out the packet to the VTEP servers. This may reduce or eliminate any configuration or changes in the VTEP servers.

In this way, when the TOR switch receives a multicast packet from the VTEP server, the TOR switch internally replicates the packet to other VTEP servers directly connected to the TOR switch which are interested in this multicast group and also sends a unicast packet to the ingress replication node. The ingress replication node handles sending this packet to other VTEPs in the network that are, for example, connected to different TOR switches. As such, replication between servers may be handled by the local TOR to which the server is connected that sourced the multicast packet.

Example advantages of this method exist. First, the method works with the existing VTEP servers with no changes. Only the participating TOR switches and routers may need to change to adapt to ingress replication, i.e., replication at the ingress TOR. Second, this may remove any need to execute multicast protocols in the L3 network. Using ingress replication in the L3 network and multicast in the leaf nodes, e.g., servers, may offer scalability advantages.

As yet another example, VTEP endpoints may be discovered by dynamically creating EVPN EBGP peering from the TOR switches to replication nodes learned via the IGP protocol (e.g., OSPF or IS-IS), and then sending VTEP VNI interest from the TOR switch to the replication node using EVPN BGP. In this example, the TOR switches execute the BGP routing protocol in their control planes and establish BGP peering sessions directly with the replication nodes learned via the IGP protocol for the L3 network.

Figure 6:
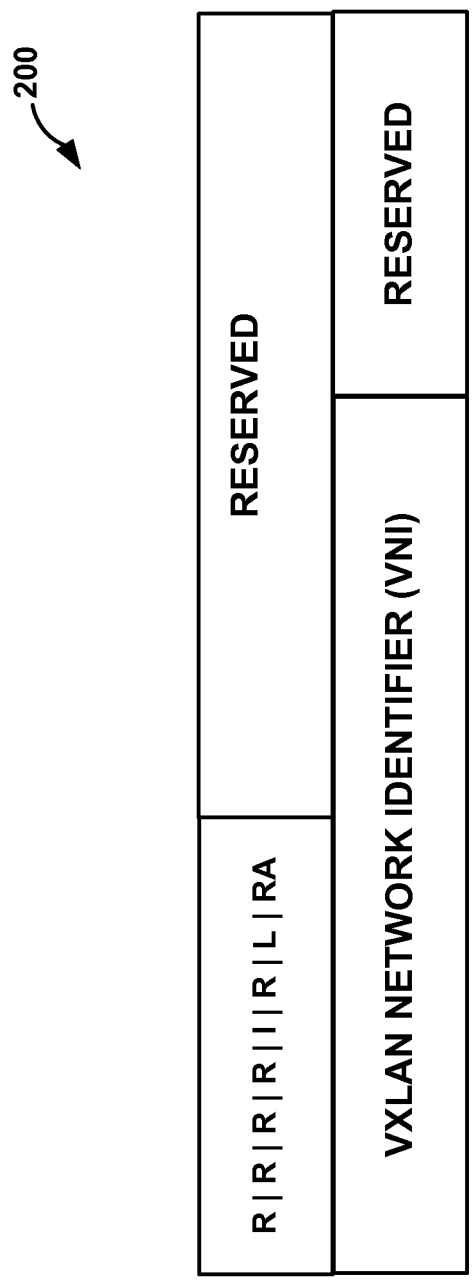
FIG. 6 is a block diagram illustrating a VXLAN Header.

FIG. 6 is an example VXLAN header 200 for use by VTEPs 17 within servers 12 or any other VTEPs so as to register with replication node 19 using VXLAN messages. As described above, VTEPs 17 executing within the hypervisors, for example, are learned by replication node 19 using VXLAN packets, such as VXLAN discovery packets. These are periodic messages are sent from the hypervisors and any other VTEPs, such as VTEPs within the underlying routing and switching infrastructure which are acting as VXLAN gateway devices to the replication node.

In the example VXLAN header 200 of FIG. 6, VXLAN router alert option is used to indicate to the replication node that the packet needs to be processed in the control plane. VXLAN Header 200 may include an "RA" field that includes a Router Alter Bit, as defined in "VxLAN Router Alert Option," IETF, draft-singh-nvo3-vxlan-router-alert-01, Mar. 3, 2014, incorporated herein by reference. The VXLAN Header may include an "L" field that includes a Learn Bit indicating to the router that the packet carries information related to learning a remote VTEP.

The content of the VXLAN packet is a TLV, described below, which provides the VNIs in which the hypervisor or any VTEP end point is interested. Upon receipt, the replication node adds the VTEP that sourced the packet to the replication list of the VNIs to which the VTEP has expressed interest.

Figures 7, 8:
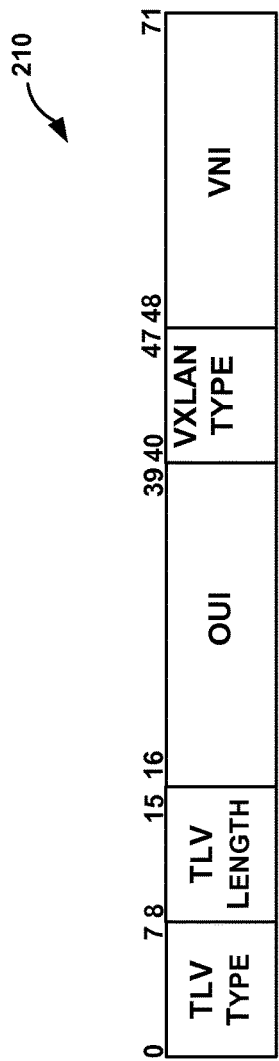
FIG. 7 is a block diagram illustrating a VNI TLV.
FIG. 8 is a block diagram illustrating a VNI Range TLV.

FIGS. 7-8 are block diagrams illustrating details for a VNI TLV that may be used by hypervisors to advertise the VNI ID details within LLDP message of the VNIs the VTEP is interested in. In this example, the devices utilize use OUI TLVs reserved range (08-FF) for VNI extensions. In particular, FIG. 7 is a block diagram illustrating an example VNI TLV 210. The number of VNI TLVs carried in LLDP from each port is based on the number of VNIs configured. FIG. 8 is a block diagram illustrating a VNI Range TLV 220 for use in the LLDP messages. In some examples, the VNI Range TLV 220 advertises VTEP server VNI ID range details in LLDP. In this example, the VNI Range TLV of FIG. 8 includes:
1) a VNI ID Start field that defines the VNI ID start value,
2) a VNI ID End field defines the VNI ID end value,
3) a VNI Block offset (VBO) field defines the VNI ID block offset,
4) a VNI Block size (VBS) field defines the VNI ID block size, and
5) a VNI Base (VB) field defines the VNI ID start value for the range.

In some examples, the VNI Range TLV Structure uses the notion of "VNI blocks". A VNI block, defined by a VNI base (VB) and a VNI block size (VBS), is a contiguous set of VNIs {VB, VB+1, ..., VB+VBS−1}. The VNIs are one to one correspondence with the (VLANs) Start to End. Each receiving VTEP end points infers the VNIs are intended for VTEPs to the corresponding VLANs.

This simple notion is enhanced with the concept of a VNI block offset VBO. A VNI block defined by <VB, VBO, and VBS> is the set {VB+VBO, VB+VBO+1, ..., VB+VBO+ VBS−1}. Thus, instead of a single large VNI block to cover all VLAN IDs in a VXLAN, one can have several VNI blocks, each with a different VNI base. In some examples, this makes VNI block management easier.

A VNI block may include a set of de-multiplexor IDs used to reach a given VXLAN/VLAN segments over VXLAN.

FIGS. 9-10 are block diagrams illustrating example LLDP TLV structures by which a TOR switch may advertise replication node bindings within LLDP messages. As described above, once the VNI associated with a Hypervisor or TOR switch is discovered, the TOR switch advertises the replication node that is associated with the VNI, as learned by IGP. In some examples, the following modes may be supported:
1) all VNI's in the network use the same replication node,
2) each VNI's in the network uses its own replication node, and
3) few VNI's use one replication node and others VNI's use a different replication node.

No assumptions are made on these mappings and all modes are supported.

In particular, FIG. 9 is a block diagram illustrating a VNI Replication ID TLV 230 that is used to send, for each VNI to replication node binding, the TLVs in LLDP to inform the peer about all the binding. FIG. 10 is a block diagram illustrating a VNI Replication ID TLV 240 that includes:
1) VNI ID Start field that defines the VNI ID start value,
2) VNI ID End field that defines the VNI ID end value,
3) VNI Block offset (VBO) field that defines the VNI ID block offset,
4) VNI Block size (VBS) field that defines the VNI ID block size, and 5) VNI Base (VB) field that defines that VNI ID start value for the range.

In some examples, similar to the VNI Range TLV Structure, the VNI Replication ID TLV Structure uses the notion of "VNI blocks". A VNI block, defined by a VNI base (VB) and a VNI block size (VBS), is a contiguous set of VNIs {VB, VB+1, . . . , VB+VBS−1}. The VNIs are one to one correspondence with the (VLANs) Start to End. Each receiving VTEP end points infers the VNIs are intended for VTEPs to the corresponding VLANs.

This notion is enhanced with the concept of a VNI block offset VBO. A VNI block defined by <VB, VBO and VBS> is the set {VB+VBO, VB+VBO+1, . . . , VB+VBO+VBS−1}. Thus, instead of a single large VNI block to cover all VLAN IDs in a VXLAN, one can have several VNI blocks, each with a different VNI base. In some examples, this may make it easier to manage the VNI blocks.

A VNI block may include a set of de-multiplexor IDs used to reach a given VXLAN/VLAN segments over VXLAN.

For VNI range to replication node binding, the outputting device may send the TLVs in LLDP to inform the peer about the binding.

Figure 11:
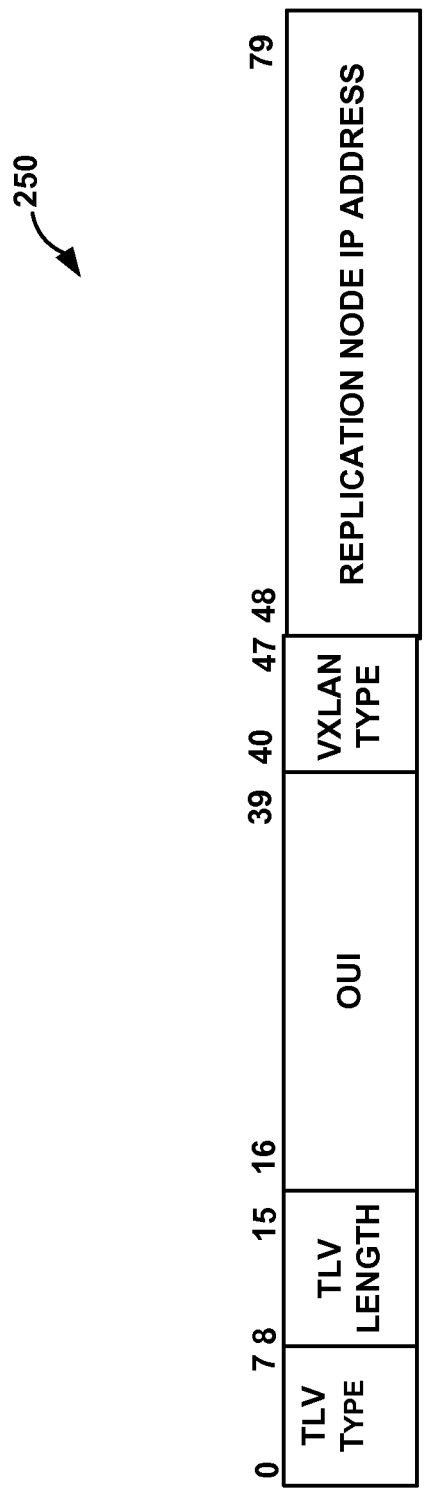
FIG. 11 is a block diagram illustrating a Replication Node ID TLV.

FIG. 11 is a block diagram illustrating a Replication Node ID TLV 250 for advertising replication node capabilities. Any device can be installed as replication node in the network. The device which acts as the replication node advertises its capability using LLDP to the TOR/aggregation switch or router to which it is connected. The replication node can be any device and there is no restriction on the replication node. If the replication node supports OSPF/IS-IS, then this capability may be advertised using OSPF/IS-IS instead of LLDP.

Figure 12A:
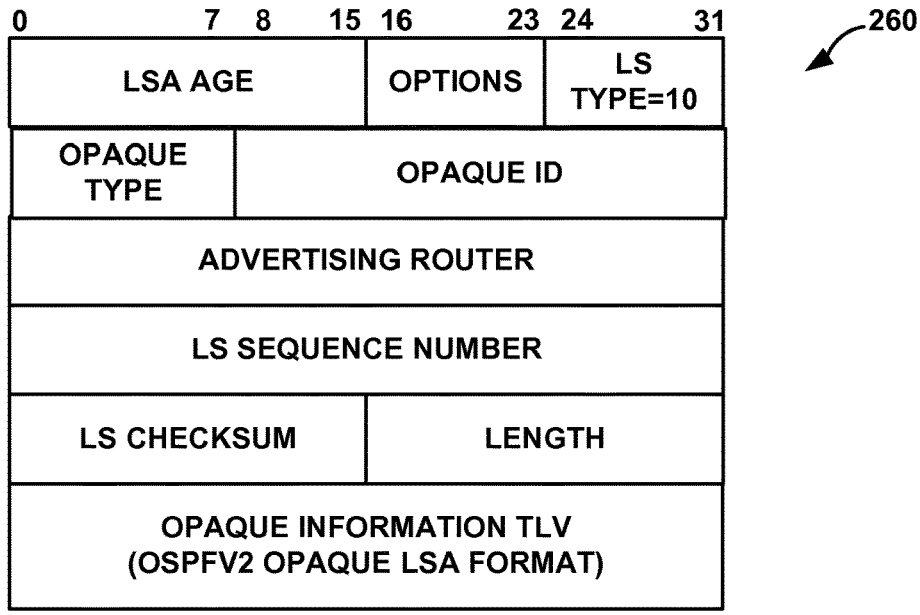
FIGS. 12A-12B are block diagram illustrating OSPF Opaque TLVs for advertising VNI binding details.
Figure 12B:
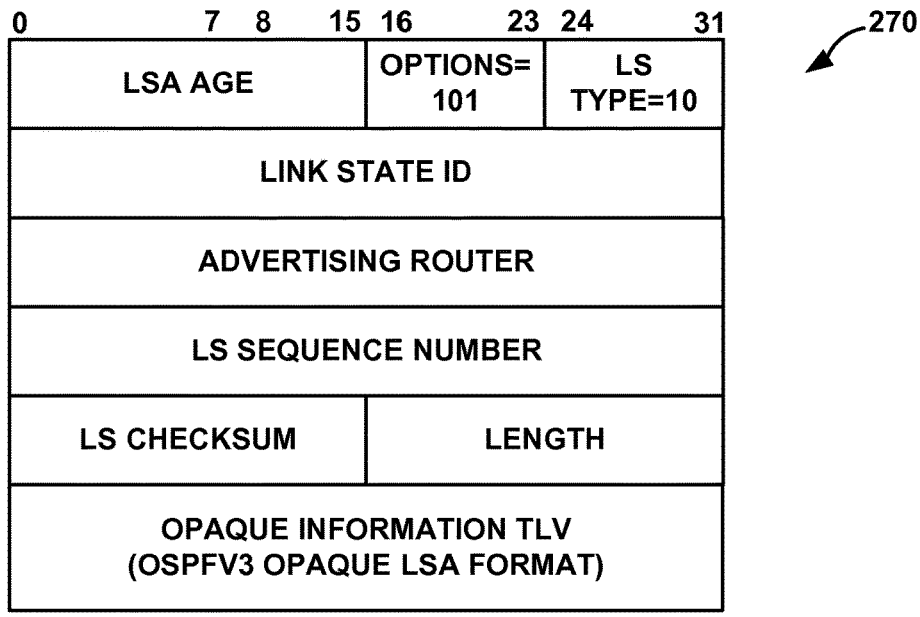

FIGS. 12A and 12B are a block diagrams illustrating an OSPF Opaque TLV 260, 270 for advertising replication node to VNI binding details using OSPF Opaque LSA (Type 10) for IPV4 and IPV6 respectively. The use of OSPF may allow the network to converge faster and use a different replication node when the original node fails. In some examples, the use of OSPF may also provide a method of load balancing across multiple replication nodes.

Implementation of the Opaque option may provide an application interface for:
1) Encapsulating application-specific information in a specific Opaque type,
2) Sending and receiving application-specific information, and/or
3) If required, informing the application of the change in validity of previously received information when topological changes are detected.

In some examples, VNI to Replication node binding data is independent of the regular routed topology and data. VNI to Replication node info Type 10 LSAs may be flooded whenever the contents change. Upon receipt of new Type 10 LSAs, a router may update its VNI to Replication node Database, which may reduce or eliminate the need to run a new SPF. In some examples, Type 10 LSAs may be throttled back so that they flood only when certain thresholds are met.

FIG. 13A is a block diagram illustrating a general TLV 272 for replication node advertisement. FIGS. 13B, 13C are block diagrams illustrating example TLVs for replication node advertisement of VNI to replication node bindings using OSPF for replication nodes that support IPv4 and IPv6, respectively. VNI to Replication node information (Opaque Information) can be added in TLV format. For example, a replication Node Advertisement may be used to advertise Opaque LSA (Type 10) with VNI to Replication binding information's to all the OSPF neighbors.

For IPv4: the TLV advertises Opaque LSA (Type 10) with VNI to Replication binding information to all the OSPF neighbors.
Type: 1
Length: Actual length of the TLV Value
Value: The actual contents, VNI (3 bytes), Replication node IP address (4 bytes) The Value contents repeats till the length of the TLV.
For IPv6:
Type: 2
Length: Actual length of the TLV Value
Value: The actual contents, VNI (3 bytes), Replication node IP address (16 bytes)
The Value contents repeats till the length of the TLV.

Figure 13D:
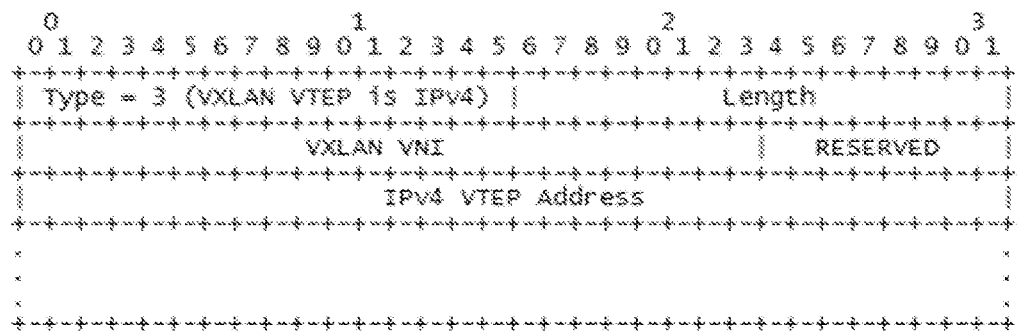
Figure 13E:
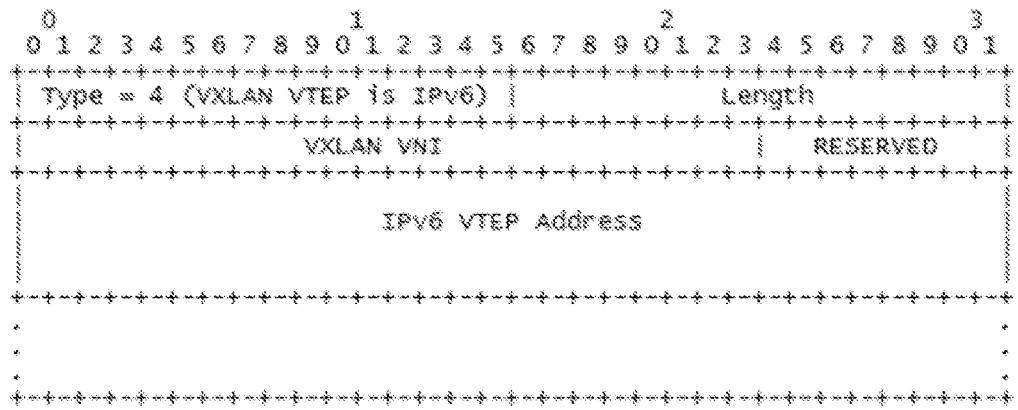

FIGS. 13D, 13E are block diagrams illustrating TLVs for VTEP advertisement of VNI to VTEP bindings using OSPF for VTEPs that support IPv4 and IPv6, respectively.

For IPv4: the TLV advertises Opaque LSA (Type 10) with VNI to Replication binding information to all the OSPF neighbors.
Type: 3
Length: Actual length of the TLV Value
Value: The actual contents, VNI (3 bytes), VTEP IP address (4 bytes)
The Value contents repeats till the length of the TLV.
For IPv6:
Type: 4
Length: Actual length of the TLV Value
Value: The actual contents, VNI (3 bytes), VTEP IP address (16 bytes)
The Value contents repeats till the length of the TLV.

FIG. 14 is a block diagram illustrating an IS-IS Router Capability TLV 300 for VXLAN VNI ID distribution. As shown in this example, the router Capability TLV may include one octet for the type, one octet that specifies the number of bytes in the value field, and a variable length value field that starts with four octets of Router ID, indicating the source of the TLV, and followed by one octet of flags.

A set of optional sub-TLVs may follow the flag field.
TYPE: 242
LENGTH: from 5 to 255
VALUE:
Router ID (4 octets)
Flags (1 octet)
Set of optional sub-TLVs (0-250 octets)

Sub-TLVs are formatted as described in RFC 3784, Intermediate System to Intermediate System (IS-IS) Extensions for Traffic Engineering (TE), IETF, June 2004, incorporated herein by reference.

If the "S" bit is set (1), the IS-IS Router CAPABILITY TLV is flooded across the entire routing domain. If the S bit is not set(0), the TLV is not leaked between levels. This bit should not be altered during the TLV leaking. When the IS-IS Router CAPABILITY TLV is leaked from level-2 to level-1, the "D" bit is set. Otherwise, this bit is clear. IS-IS Router capability TLVs with the D bit set are not leaked from level-1 to level-2 to prevent TLV looping. Each sub-TLV consists of three fields, a one-octet Type field, a one-octet Length field, and zero or more octets of Value. In VXLAN use case, the value field will carry VNI IDs. The sub-TLVs may be of the following size:
1 octet of sub-type,
1 octet of length of the value field of the sub-TLV, and
0-248 octets of value.

Various embodiments of the invention have been described. These and other embodiments are within the scope of the following claims.

The invention claimed is:

1. A method comprising:
sending, by a router that includes a replication node for broadcast, unidentified unicast and multicast (BUM) traffic in a virtual extensible local area network (VXLAN) toward one or more VXLAN tunnel endpoints (VTEPs), an advertisement including an address of the replication node and at least one virtual network identifier (VNI) range associated with the replication node, wherein the at least one VNI range specifies at least a starting VNI and an ending VNI;
in response to the advertisement, receiving, by the router, at least one registration message including one or more VNI ranges in which the one or more VTEPs are interested, wherein each of the one or more VNI ranges specifies at least a starting VNI and an ending VNI;
upon receiving the at least one registration message, constructing, by the router, a distribution tree in the VXLAN; and
replicating, by the replication node of the router, BUM traffic toward the one or more VTEPs via the distribution tree.

2. The method of claim 1, wherein sending the advertisement comprises sending, by the router to one or more network switches connected to the one or more VTEPs, the advertisement using an Internal Gateway Protocol (IGP) extension, wherein each of the network switches propagates the advertisement to the one or more VTEPs using a link layer discovery protocol (LLDP) extension.

3. The method of claim 1,
wherein receiving the at least one registration message includes receiving, by the router from each of the one or more VTEPs, a VXLAN VNI discovery packet including the one or more VNI ranges in which the respective one of the one or more VTEPs is interested;
wherein constructing the distribution tree comprises constructing, by the router, the distribution tree to the one or more VTEPs; and
wherein replicating the BUM traffic comprises replicating, by the replication node of the router, BUM traffic received from one of the one or more VTEPs to one or more other VTEPs via the distribution tree.

4. The method of claim 1,
wherein receiving the at least one registration message includes receiving, by the router from one or more network switches connected to the one or more VTEPs, a VXLAN VTEP registration message including the one or more VNI ranges in which the one or more VTEPs are interested;
wherein constructing the distribution tree comprises constructing, by the router, the distribution tree to the network switches; and
wherein replicating the BUM traffic comprises replicating, by the replication node of the router, BUM traffic received from one of the network switches to one or more other network switches via the distribution tree, wherein each of the network switches replicates the BUM traffic to the one or more VTEPs.

5. A router in a virtual extensible local area network (VXLAN), the router comprising:
a forwarding engine having a replication node configured to replicate broadcast, unidentified unicast and multicast (BUM) traffic; and
a routing engine configured to:
send toward one or more VXLAN tunnel endpoints (VTEPs) an advertisement including an address of the replication node and at least one virtual network identifier (VNI) range associated with the replication node, wherein the at least one VNI range specifies at least a starting VNI and an ending VNI, and
in response to the advertisement, receive at least one registration message including one or more VNI ranges in which the one or more VTEPs are interested, wherein each of the one or more VNI ranges in which the one or more VTEPs are interested specifies at least a starting VNI and an ending VNI, and, upon receiving the at least one registration message, construct a distribution tree in the VXLAN by which the replication node replicates traffic to the one or more VTEPs.

6. The router of claim 5, wherein the routing engine is configured to send the advertisement to one or more network switches connected to the one or more VTEPs using an Internal Gateway Protocol (IGP) extension, wherein each of the network switches propagates the advertisement to the one or more VTEPs using a link layer discovery protocol (LLDP) extension.

7. The router of claim 5,
wherein the routing engine is configured to receive, from each of the one or more VTEPs, a VXLAN VNI discovery packet including the one or more VNI ranges in which the respective one of the one or more VTEPs is interested, and construct the distribution tree to the one or more VTEPs; and
wherein the replication node included in the forwarding engine is configured to replicate BUM traffic received from one of the one or more VTEPs to one or more other VTEPs via the distribution tree.

8. The router of claim 5,
wherein the routing engine is configured to receive, from one or more network switches connected to the one or more VTEPs, a VXLAN VTEP registration message including the one or more VNI ranges in which the one or more VTEPs are interested, and construct the distribution tree to the network switches; and
wherein the replication node included in the forwarding engine is configured to replicate BUM traffic received from one of the network switches to one or more other network switches via the distribution tree, wherein each of the network switches replicates the BUM traffic to the one or more VTEPs.

9. A method comprising:
receiving, by a network switch in a virtual extensible local area network (VXLAN) from a router that includes a replication node for broadcast, unidentified unicast and multicast (BUM) traffic, a first advertisement including an address of the replication node and at least one virtual network identifier (VNI) range associated with the replication node, wherein the at least one VNI range specifies at least a starting VNI and an ending VNI;
upon receiving the first advertisement, sending, by the network switch to one or more VXLAN tunnel endpoints (VTEPs) connected to the network switch in the VXLAN, a second advertisement including the address of the replication node and the at least one VNI range associated with the replication node; and
upon registration of at least one of the one or more VTEPs with the router and construction of a distribution tree in the VXLAN, forwarding, by the network switch, BUM traffic received from the replication node of the router toward the one or more VTEPs.

10. The method of claim 9,
wherein receiving the first advertisement comprises
receiving, by the network switch from the router, the
first advertisement using an Internal Gateway Protocol
(IGP) extension;
wherein sending the second advertisement comprises
sending, by the network switch to the one or more
VTEPs, the second advertisement using a link layer
discovery protocol (LLDP) extension.

11. The method of claim 9, further comprising:
receiving, by the network switch from the one or more
VTEPs, a third advertisement including one or more
VNI ranges in which the one or more VTEPs are
interested, wherein each of the one or more VNI ranges
in which the one or more VTEPs are interested specifies
at least a starting VNI and an ending VNI;
in response to the third advertisement, sending, by the
network switch to the router, a VXLAN VTEP registration message including the one or more VNI ranges
in which the one or more VTEPs are interested; and
upon construction of the distribution tree from the router
to the network switch, receiving, by the network switch
from the replication node of the router, BUM traffic via
the distribution tree, and replicating, by the network
switch, the received BUM traffic on all ports of the
network switch connected to the one or more VTEPs.

12. The method of claim 9, further comprising:
determining, by the network switch, a particular multicast
group that the one or more VTEPs are requesting to
join;
determining, by the network switch, a particular VNI
range in which the one or more VTEPs are interested
based on the particular multicast group, wherein the
particular VNI range in which the one or more VTEPs
are interested specifies at least a starting VNI and an
ending VNI;
sending, by the network switch to the router, a VXLAN
VTEP registration message including the particular
VNI range in which the one or more VTEPs are
interested; and
upon construction of the distribution tree from the router
to the network switch, receiving, by the network switch
from the replication node of the router, BUM traffic via
the distribution tree, and replicating, by the network
switch, the received BUM traffic on all ports of the
network switch connected to the one or more VTEPs.

13. The method of claim 9, further comprising:
constructing, by the network switch, an Ethernet Virtual
Private Network (EVPN) Border Gateway Protocol
(EBGP) peering between the network switch and the
router;
receiving, by the network switch from the one or more
VTEPs, a third advertisement including one or more
VNI ranges in which the one or more VTEPs are
interested, wherein each of the one or more VNI ranges
in which the one or more VTEPs are interested specifies
at least a starting VNI and an ending VNI;
in response to the third advertisement, sending, by the
network switch to the router, an EVPN BGP VTEP
registration message including the one or more VNI
ranges in which the one or more VTEPs are interested;
and
upon construction of the distribution tree from the router
to the network switch, receiving, by the network switch
from the replication node of the router, BUM traffic via
the distribution tree, and replicating, by the network
switch, the received BUM traffic on all ports of the
network switch connected to the one or more VTEPs.

14. A network switch in a virtual extensible local area
network (VXLAN), the network switch comprising:
a routing engine configured to:
receive, from a router that includes a replication node
for broadcast, unidentified unicast and multicast
(BUM) traffic, a first advertisement including an
address of the replication node and at least one
virtual network identifier (VNI) range associated
with the replication node, wherein the at least one
VNI range specifies at least a starting VNI and an
ending VNI, and
upon receiving the first advertisement, send a second
advertisement including the address of the replication node and the at least one VNI range associated
with the replication node to one or more VXLAN
tunnel endpoints (VTEPs) connected to the network
switch in the VXLAN; and
a forwarding engine configured to, upon registration of at
least one of the one or more VTEPs with the router and
construction of a distribution tree in the VXLAN,
forward BUM traffic received from the replication node
of the router toward the one or more VTEPs.

15. The network switch of claim 14, wherein the routing
engine is configured to receive the first advertisement from
the router using an Internal Gateway Protocol (IGP) extension, and wherein the routing engine is configured to send
the second advertisement to the one or more VTEPs using a
link layer discovery protocol (LLDP) extension.

16. The network switch of claim 14,
wherein the routing engine is configured to receive a third
advertisement from the one or more VTEPs including
one or more VNI ranges in which the one or more
VTEPs are interested wherein each of the one or more
VNI ranges in which the one or more VTEPs are
interested specifies at least a starting VNI and an ending
VNI, and, in response to the third advertisement, send
a VXLAN VTEP registration message to the router
including the one or more VNI ranges in which the one
or more VTEPs are interested; and
wherein the forwarding engine is configured to, upon
construction of the distribution tree from the router to
the network switch, receive BUM traffic from the
replication node of the router via the distribution tree,
and replicate the received BUM traffic on all ports of
the network switch connected to the one or more
VTEPs.

17. The network switch of claim 14,
wherein the routing engine is configured to determine a
particular multicast group that the one or more VTEPs
are requesting to join, determine a particular VNI range
in which the one or more VTEPs are interested based
on the particular multicast group, wherein the particular
VNI range in which the one or more VTEPs are
interested specifies at least a starting VNI and an ending
VNI, and send a VXLAN VTEP registration message to
the router including the particular VNI range in which
the one or more VTEPs are interested; and
wherein the forwarding engine is configured to, upon
construction of the distribution tree from the router to
the network switch, receive BUM traffic from the
replication node of the router via the distribution tree,
and replicate the received BUM traffic on all ports of
the network switch connected to the one or more
VTEPs.

18. The network switch of claim 14, wherein the routing engine is configured to construct an Ethernet Virtual Private Network (EVPN) Border Gateway Protocol (EBGP) peering between the network switch and the router, receive a third advertisement from the one or more VTEPs including one or more VNI ranges in which the one or more VTEPs are interested, wherein each of the one or more VNI ranges in which the one or more VTEPs are interested specifies at least a starting VNI and an ending VNI, and, in response to the third advertisement, send an EVPN BGP VTEP registration message to the router including the one or more VNI ranges in which the one or more VTEPs are interested; and wherein the forwarding engine is configured to, upon construction of the distribution tree from the router to the network switch, receive BUM traffic from the replication node of the router via the distribution tree, and replicate the received BUM traffic on all ports of the network switch connected to the one or more VTEPs.

19. A system comprising a router that includes a replication node for broadcast, unidentified unicast and multicast (BUM) traffic in a virtual extensible local area network (VXLAN), the router is configured to send a first advertisement including an address of the replication node and at least one virtual network identifier (VNI) range associated with the replication node using an Internal Gateway Protocol (IGP), wherein the at least one VNI range specifies at least a starting VNI and an ending VNI;

one or more network switches connected to the router included in the VXLAN, each of the network switches is configured to receive the first advertisement and send a second advertisement including the address of the replication node and the at least one VNI range associated with the replication node using a link layer discovery protocol (LLDP); and one or more VXLAN tunnel endpoints (VTEPs) connected to the one or more network switches in the VXLAN, each of the one or more VTEPs is configured to indicate one or more VNI ranges in which the respective one of the one or more VTEPs is interested, wherein each of the one or more VNI ranges in which the respective one of the one or more VTEPs is interested specifies at least a starting VNI and an ending VNI, wherein, in response to the first advertisement, the router receives at least one registration message including the one or more VNI ranges in which the respective one of the one or more VTEPs are interested, constructs a distribution tree in the VXLAN, and replicates BUM traffic toward the one or more VTEPs via the distribution tree, and wherein the one or more network switches forward the BUM traffic received from the router toward the one or more VTEPs.

20. The system of claim 19, wherein, in order to indicate one or more VNI ranges in which the respective one of the one or more VTEPs is interested, each of VTEPs is configured to one of:

send, to the router, a VXLAN VNI discovery packet including the one or more VNI ranges in which the respective one of the one or more VTEPs is interested;

send, to the one or more network switches, a third advertisement including the one or more VNI ranges in which the respective one of the one or more VTEPs is interested, wherein the network switches send a VXLAN VTEP registration message for the respective one of the one or more VTEPs to the router;

send, to the one or more network switches, a message requesting to join a particular multicast group, wherein the network switches determine a particular VNI range in which the respective one of the one or more VTEPs is interested based on the particular multicast group and send a VXLAN VTEP registration message for the respective one of the one or more VTEPs to the router; or send, to the one or more network switches, a fourth advertisement including the one or more VNI ranges in which the respective one of the one or more VTEPs is interested, wherein the network switches construct an Ethernet Virtual Private Network (EVPN) Border Gateway Protocol (EBGP) peering with the router and send an EVPN BGP VTEP registration message for the respective one of the one or more VTEPs to the router.

\* \* \* \* \*